(12) United States Patent
Tokoi et al.

(10) Patent No.: US 11,193,584 B2
(45) Date of Patent: Dec. 7, 2021

(54) HYBRID VEHICLE CONTROL DEVICE

(71) Applicants: JATCO Ltd, Fuji (JP); NISSAN MOTOR CO., LTD., Yokohama (JP)

(72) Inventors: Hiroyuki Tokoi, Isehara (JP); Kenji Yoneda, Sagamihara (JP); Hironori Miyaishi, Sagamihara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 537 days.

(21) Appl. No.: 16/314,163

(22) PCT Filed: Jun. 27, 2017

(86) PCT No.: PCT/JP2017/023512
§ 371 (c)(1),
(2) Date: Dec. 28, 2018

(87) PCT Pub. No.: WO2018/003778
PCT Pub. Date: Jan. 4, 2018

(65) Prior Publication Data
US 2020/0032900 A1      Jan. 30, 2020

(30) Foreign Application Priority Data

Jul. 1, 2016 (JP) .............................. JP2016-131306

(51) Int. Cl.
*F16H 61/662* (2006.01)
*B60W 10/107* (2012.01)
*F16H 61/04* (2006.01)

(52) U.S. Cl.
CPC ..... *F16H 61/66272* (2013.01); *B60W 10/107* (2013.01); *B60W 2710/1083* (2013.01);
(Continued)

(58) Field of Classification Search
CPC ....... F16H 61/66272; F16H 2061/0462; F16H 2061/66281; F16H 2061/6605;
(Continued)

(56) References Cited

U.S. PATENT DOCUMENTS 5,720,692 A    2/1998  Kashiwabara
9,133,930 B2   9/2015  Takahashi et al.
(Continued)

FOREIGN PATENT DOCUMENTS

| JP | 08-285021 A | 11/1996 | |
|---|---|---|---|
| KR | 20150099561 A | * 8/2015 | ....... F16H 61/66272 |
| WO | WO-2013-145974 A1 | 10/2013 | |

*Primary Examiner* — Justin Holmes
(74) *Attorney, Agent, or Firm* — Foley & Lardner LLP

(57) ABSTRACT

For a hybrid vehicle including an engine, a motor generator, and a belt-type continuously variable transmission, a controller performs a low speed position return expediting control in response to a downshift request accompanying deceleration. During the low speed position return expediting control, the controller increases a differential pressure between a primary pressure and a secondary pressure and cause a downshift toward a lowest speed position transmission ratio by reducing the primary pressure, and further reduces the primary pressure when the secondary pressure becomes greater than or equal to a trigger threshold value during the downshift; and terminates the low speed position return expediting control when an actual secondary pressure decreases to a secondary pressure minimum level. The controller further sets a secondary pressure lower limit higher than the secondary pressure minimum level during the low speed position return expediting control.

10 Claims, 9 Drawing Sheets

(52) U.S. Cl.
CPC .............. *F16H 2061/0462* (2013.01); *F16H 2061/66281* (2013.01)

(58) Field of Classification Search
CPC ......... F16H 61/66259; F16H 2059/683; F16H 59/72; F16H 59/18; F16H 59/40; F16H 59/42; F16H 59/44; F16H 61/662; F16H 61/02; F16H 59/68; B60W 10/107; B60W 2710/1083
See application file for complete search history.

(56) References Cited

U.S. PATENT DOCUMENTS

2004/0102288 A1\* 5/2004 Ayabe .................. B60W 30/18
477/117
2016/0368499 A1\* 12/2016 Kimura ................. B60K 6/543

\* cited by examiner

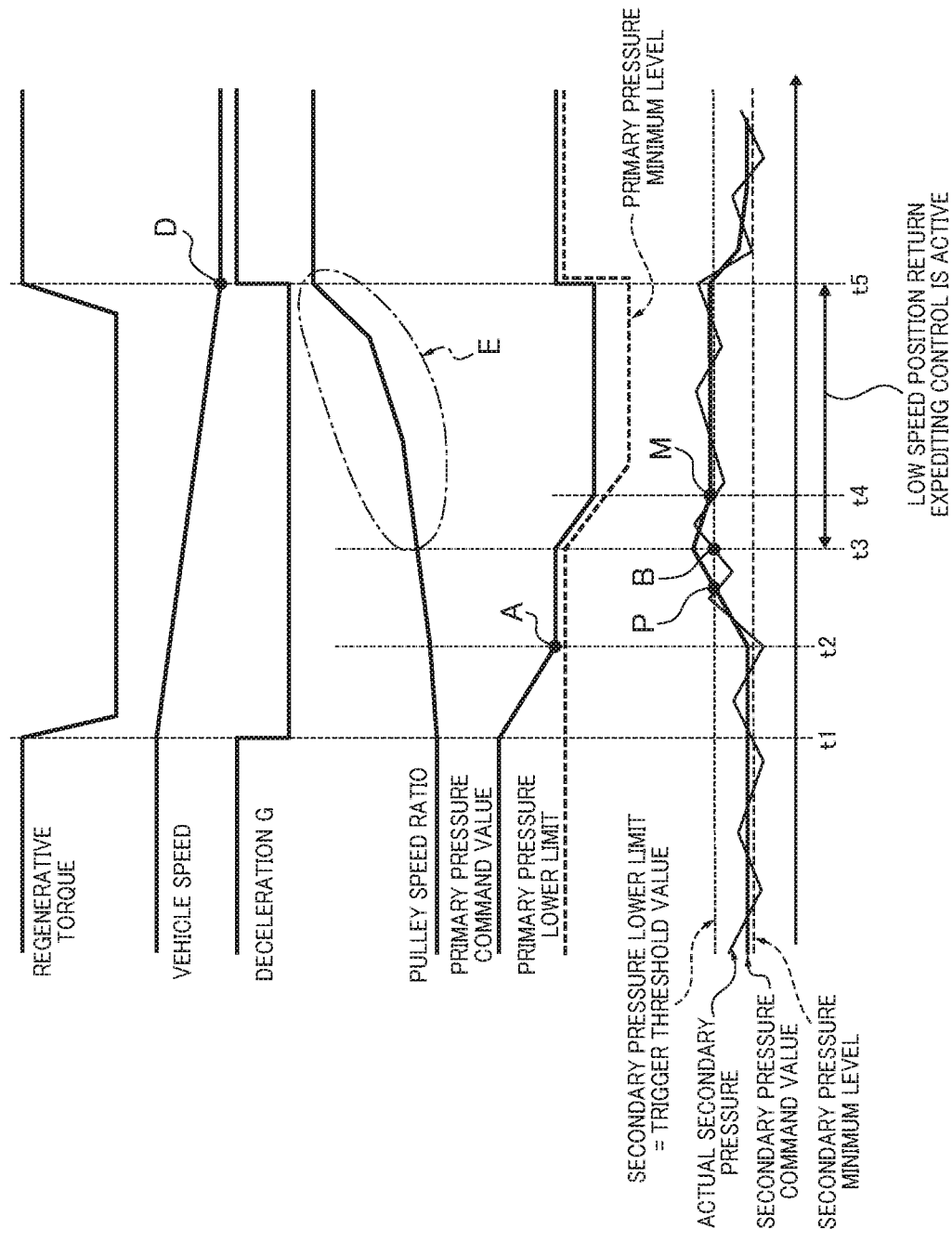

HYBRID VEHICLE CONTROL DEVICE

CROSS-REFERENCE TO RELATED APPLICATIONS

This application is a National Phase of International Patent Application No. PCT/JP2017/023512 filed on Jun. 27, 2017, which claims priority to Japanese Patent Application No. 2016-131306 filed on Jul. 1, 2016. The contents of these applications are herein incorporated by reference in their entirety.

TECHNICAL FIELD

The present invention relates to a control device for a continuously variable transmission which is configured to perform a low speed position return expediting control for increasing a differential pressure between a primary pressure and a secondary pressure at least by reducing the primary pressure in response to a downshift request accompanying a deceleration.

BACKGROUND ART

Conventionally, a belt-type continuously variable transmission is known which is configured to perform a low speed position return expediting control for expediting a speed of progress of shifting to a lowest speed position (i.e. low speed position return speed) by increasing a differential pressure between a primary pressure and a secondary pressure by reducing the primary pressure in response to a downshift request accompanying a deceleration. However, the reduction of the primary pressure is limited, because a primary pressure lower limit is set for the primary pressure. Accordingly, during downshifting by the low speed position return expediting control, the primary pressure lower limit is reduced to increase a margin of reduction of the primary pressure and thereby expedite the low speed position return speed (see patent document 1, for example).

When the low speed position return speed is slow in a situation of slow deceleration or the like, the differential pressure required for the low speed position return expediting control is smaller than in a situation of rapid deceleration. Namely, the margin of reduction of the primary pressure may be small.

However, if the primary pressure lower limit is set for expediting the low speed position return speed independently of the deceleration, it is possible that the margin of reduction of the primary pressure is excessive with respect to an intended low speed position return speed under slow deceleration. In such a situation, the secondary pressure is reduced to prevent the low speed position return speed from becoming excessive. If the reduction of the secondary pressure causes the secondary pressure to fall to a pressure minimum level required to prevent belt slipping from being caused by an input torque to a secondary pulley, the low speed position return expediting control is terminated to increase the primary pressure and the secondary pressure. This is intended for prioritizing the prevention of belt slipping over the low speed position return expediting control, and terminating the low speed position return expediting control, and increasing the primary pressure and the secondary pressure, in consideration that the decrease of the secondary pressure below the pressure minimum level causes belt slipping.

Accordingly, during the low speed position return expediting control, the primary pressure and the secondary pressure in the reduced state are increased for prevention of belt slipping. When the secondary pressure reaches a trigger threshold value, the primary pressure and the secondary pressure in the increased state are reduced again, and then increased again. In this way, the low speed position return expediting control under slow deceleration is confronted by a problem that hunting of hydraulic pressure occurs where the primary pressure and the secondary pressure increase and decrease repeatedly.

PRIOR ART DOCUMENT(S)

Patent Document(s)

Patent Document 1: International Publication WO 2013/145974 A1

SUMMARY OF THE INVENTION

The present invention is made with attention to the problem described above, and is targeted for preventing the occurrence of hunting of hydraulic pressure where the primary pressure and the secondary pressure increase and decrease repeatedly during the low speed position return expediting control for downshifting accompanying deceleration.

In order to accomplish the purpose described above, according to the present invention, a continuously variable transmission control device for a continuously variable transmission, wherein the continuously variable transmission includes a primary pulley, a secondary pulley, and a pulley belt, wherein the pulley belt is structured to transmit power between the primary pulley and the secondary pulley, and wherein the continuously variable transmission is configured to implement a shift control for shifting a pulley speed ratio by control of a primary pressure supplied to the primary pulley and a secondary pressure supplied to the secondary pulley, the continuously variable transmission control device comprises: a controller configured to: perform a low speed position return expediting control for increasing a differential pressure between the primary pressure and the secondary pressure at least by reducing the primary pressure in response to a downshift request accompanying deceleration; and set a secondary pressure lower limit higher than a secondary pressure minimum level during the low speed position return expediting control, wherein the secondary pressure lower limit is a lower limit value of the secondary pressure, and wherein the secondary pressure minimum level is a level required to prevent belt slipping from being caused by an input torque to the secondary pulley.

This configuration serves to prevent hunting of hydraulic pressure where the primary pressure and the secondary pressure increase and decrease repeatedly during the low speed position return expediting control for downshifting accompanying deceleration.

BRIEF DESCRIPTION OF THE DRAWINGS

FIG. 9 is a time chart showing characteristics of regenerative torque, vehicle speed, pulley speed ratio, primary pressure command value, secondary pressure command value, and actual secondary pressure when the low speed position return expediting control is performed under slow deceleration where a secondary pressure command value decreases, according to the second embodiment.

MODE(S) FOR CARRYING OUT THE INVENTION

Figure 1:
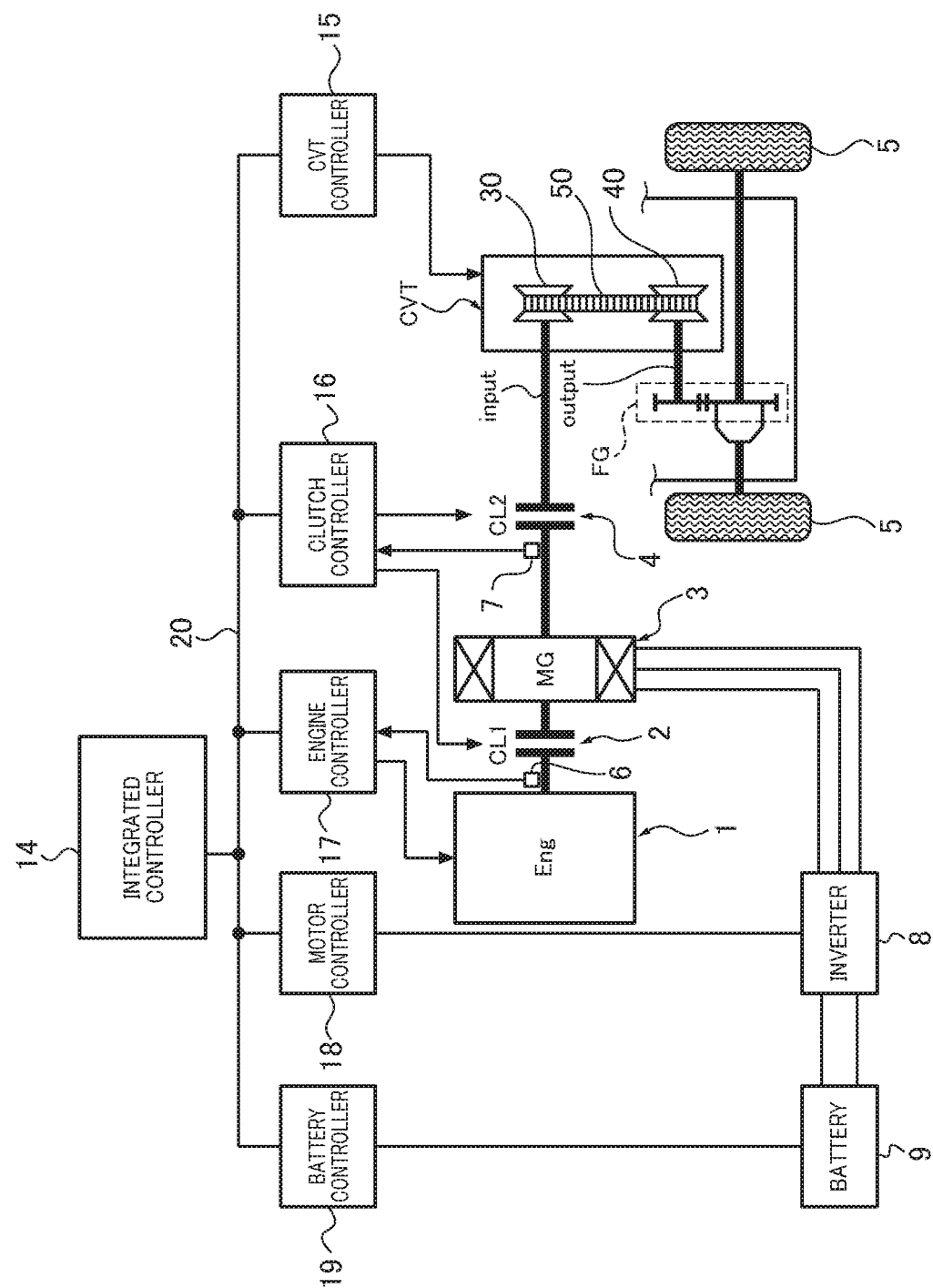
FIG. 1 is a whole system diagram showing an FF hybrid vehicle to which a control device for a belt-type continuously variable transmission according to a first embodiment is applied.

The following describes the best mode for carrying out a continuously variable transmission control device according to the present invention, with reference to first and second embodiments shown in the drawings.

First Embodiment

First, the following describes configuration of the continuously variable transmission control device according to the first embodiment, which is applied to an FF hybrid vehicle where a belt-type continuously variable transmission is mounted in a driveline. The following describes configuration of the continuously variable transmission control device according to the first embodiment, separately in sections [Whole System Configuration], [Configuration of Shift Control of Belt-Type Continuously Variable Transmission], and [Configuration of Process of Low Speed Position Return Expediting Control]. For description of the first and second embodiments, a low speed position is referred as "Low" and a high speed position is referred as "High".

[Whole System Configuration] FIG. 1 is a whole system diagram showing the FF hybrid vehicle to which the control device for the belt-type continuously variable transmission is applied. The following describes whole system configuration of the FF hybrid vehicle including a drive system and a control system, with reference to FIG. 1.

As shown in FIG. 1, the drive system of the FF hybrid vehicle includes an engine 1 (Eng), a first clutch 2 (CL1), a motor generator 3 (MG), a second clutch 4 (CL2), a belt-type continuously variable transmission CVT, a final gear FG, and left and right driving wheels 5, 5. This one-motor and two-clutches parallel hybrid drive system employs operation modes including an electric vehicle mode (EV mode), a hybrid vehicle mode (HEV mode), and a drive torque control start mode (WSC mode).

The EV mode is a mode where a vehicle is driven only by power of motor generator 3 with first clutch 2 disengaged. The HEV mode is a mode where the vehicle is driven in one of a motor assist mode, a running generation mode, and an engine mode, with first clutch 2 engaged. The WSC mode is a mode where at vehicle start by P or N to D selecting operation in the HEV mode, second clutch 4 is maintained in slip engaged state, and the torque capacity of second clutch 4 is controlled to set a transmitted torque through second clutch 4 equal to a requested driving torque. The term "WSC" is an abbreviation of Wet Start Clutch.

First clutch 2 (CL1) is arranged between engine 1 and motor generator 3, and is implemented by a normally open dry-type multiplate clutch configured to be engaged by hydraulic pressure, for example. First clutch 2 is configured to have a state of engagement enhanced from a disengaged state, and allow motor generator 3 as a starter motor to crank the engine 1, in response to a request for mode transition from the EV mode to the HEV mode.

Motor generator 3 (MG) has an alternating current synchronous motor structure, and is configured to be controlled by motor torque control and motor rotation speed control during vehicle start and during vehicle running. Motor generator 3 is operated by regeneration control with a negative torque command value, during braking by a brake or deceleration by accelerator pedal release, thereby converting kinetic energy of the vehicle to electric energy which is collected in battery 9 by charging.

Second clutch 4 (CL2) is implemented by a start clutch or reverse clutch of a normally open type (wet type multiplate hydraulic clutch) that is provided in a forward-rearward switching mechanism upstream of belt-type continuously variable transmission CVT. Second clutch 4 is arranged between motor generator 3 and belt-type continuously variable transmission CVT as shown in FIG. 1, but may be arranged between belt-type continuously variable transmission CVT and left and right driving wheels 5, 5.

Figure 2:
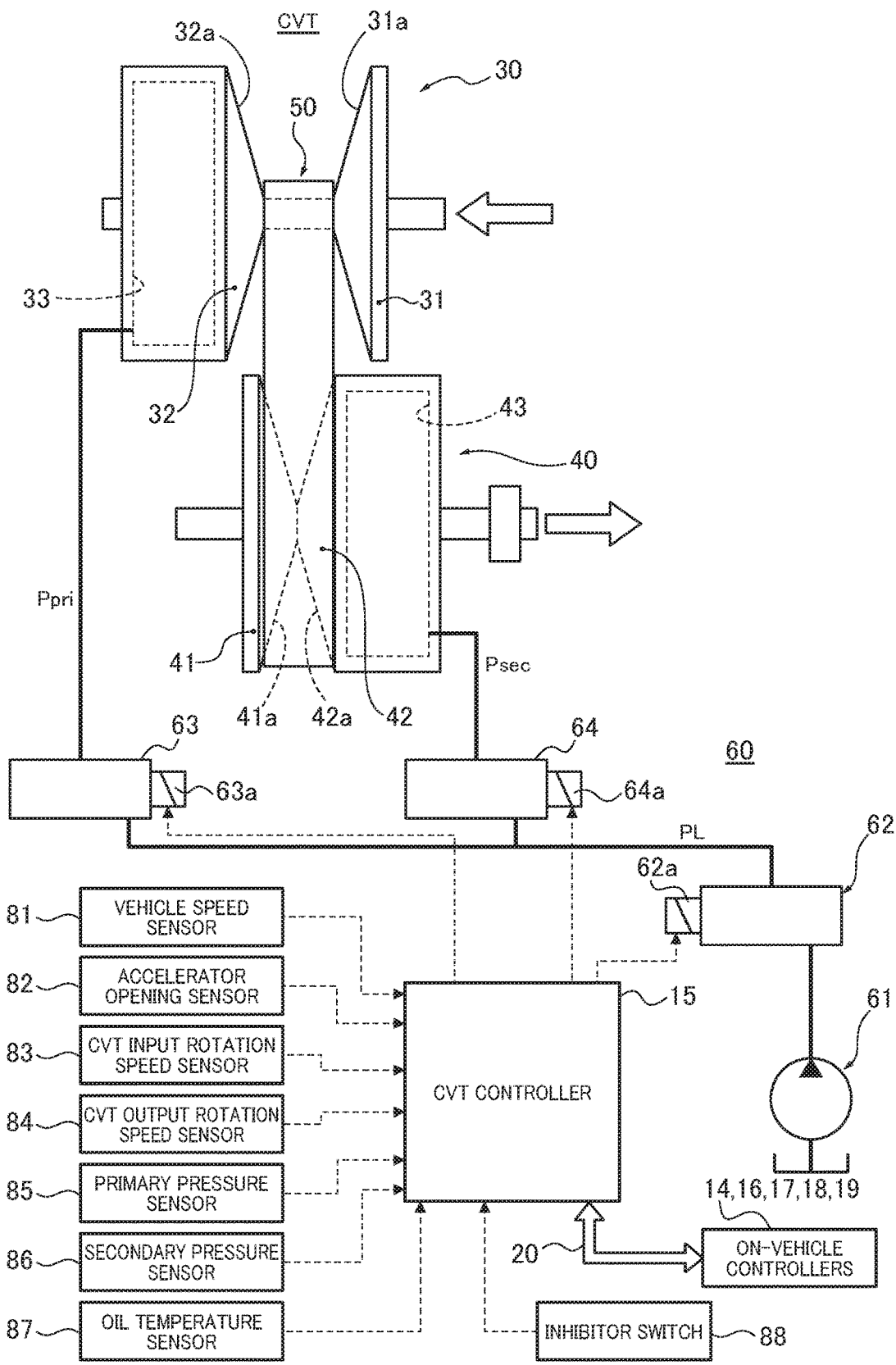
FIG. 2 is a control system configuration diagram showing configuration of a hydraulic pressure control system and an electronic control system of the belt-type continuously variable transmission according to the first embodiment.

Belt-type continuously variable transmission CVT includes a primary pulley 30, a secondary pulley 40, and a pulley belt 50, wherein pulley belt 50 is wound over primary pulley 30 and secondary pulley 40 (see FIG. 2 for detail configuration).

As shown in FIG. 1, the FF hybrid vehicle includes a control system including controllers, namely, an integrated controller 14, a transmission controller 15, a clutch controller 16, an engine controller 17, a motor controller 18, and a battery controller 19.

Integrated controller 14 is configured to calculate a target driving torque, based on a state of the battery, an accelerator opening, a vehicle speed (proportional to a transmission output rotation speed), and a working oil temperature. Based on a result of the calculation, integrated controller 14 calculates a command for each actuator (engine 1, first clutch 2, motor generator 3, second clutch 4, belt-type continuously variable transmission CVT), and sends the command through a CAN communication line 20 to controllers 15, 16, 17, 18 and 19.

Transmission controller 15 is configured to perform a shift control by control of a primary pressure Ppri and a secondary pressure Psec supplied respectively to primary pulley 30 and secondary pulley 40 of belt-type continuously variable transmission CVT, so as to meet the command from integrated controller 14. Clutch controller 16 is configured to receive input of information from a motor rotation speed sensor 7 and others, and output clutch hydraulic pressure command values to first clutch 2 and second clutch 4, so as to meet the command from integrated controller 14. Engine controller 17 is configured to receive input of information from an engine rotation speed sensor 6 and others, and perform an engine torque control and an engine rotation speed control, so as to meet the command from integrated controller 14.

Motor controller 18 is configured to output a control command to an inverter 8, and control the motor generator 3 by motor torque control and motor rotation speed control, so as to meet the command from integrated controller 14. Motor controller 18 is further configured to perform a regenerative control for electric generation by motor generator 3 during deceleration. Inverter 8 serves for bidirectional conversion between direct current form and alternating current form, and is configured to convert a discharged current of battery 9 to a driving current for motor generator 3, and convert a generated current of motor generator 3 to a charging current for battery 9. Battery controller 19 is configured to manage a state of charge SOC of battery 9, and send the SOC information to integrated controller 14 and motor controller 18.

[Configuration of Shift Control of Belt-Type Continuously Variable Transmission] FIG. 2 is a control system configuration diagram showing configuration of a hydraulic pressure control system and an electronic control system of the belt-type continuously variable transmission according to the first embodiment. The following describes configuration of shift control of belt-type continuously variable transmission CVT with reference to FIG. 2.

As shown in FIG. 2, belt-type continuously variable transmission CVT includes primary pulley 30, secondary pulley 40, and pulley belt 50. Belt-type continuously variable transmission CVT is configured to control a speed ratio between primary pulley 30 and secondary pulley 40 (i.e. pulley speed ratio) variably, by varying the pulley width of each pulley 30, 40, and thereby varying the diameter of surfaces of each pulley 30, 40 sandwiching the pulley belt 50. The pulley speed ratio is changed toward a low speed position side, by increase of the pulley width of primary pulley 30 and decrease of the pulley width of secondary pulley 40. The pulley speed ratio is changed toward a high speed position side, by decrease of the pulley width of primary pulley 30 and increase of the pulley width of secondary pulley 40.

Primary pulley 30 is an input-side pulley configured to receive input of a driving torque from engine 1 and motor generator 3, and is composed of a stationary pulley 31 including a sheave surface 31a and a drive pulley 32 including a sheave surface 32a. Drive pulley 32 includes a primary pressure chamber 33 configured to hydraulically drive the drive pulley 32 in an axial direction with respect to stationary pulley 31 by supply of primary pressure Ppri.

Secondary pulley 40 is an output-side pulley configured to output a driving torque to left and right driving wheels 5, 5 via final gear FG, and is composed of a stationary pulley 41 including a sheave surface 41a and a drive pulley 42 including a sheave surface 42a. Drive pulley 42 includes a secondary pressure chamber 43 configured to hydraulically drive the drive pulley 42 in an axial direction with respect to stationary pulley 41 by supply of secondary pressure Psec.

Pulley belt 50 is a member for transmission of power between primary pulley 30 and secondary pulley 40, and is wound over sheave surfaces 31a, 32a of primary pulley 30 and sheave surfaces 41a, 42a of secondary pulley 40. Pulley belt 50 serves for continuously variable shifting where the distance between opposite sheave surfaces 31a, 32a and the distance between opposite sheave surfaces 41a, 42a are varied to vary the diameters of winding of pulley belt 50 relatively. Pulley belt 50 is implemented by a chain-type belt or an element-type belt (VDT-type belt), for example. A chain-type belt has a structure where two pins having arc shapes are joined together with their back sides on each other, and connected by multiple links, and transmits power by tensile torque. An element-type belt has a structure where multiple elements are sandwiched between two multilayer rings, and transmits power by compression torque.

As shown in FIG. 2, belt-type continuously variable transmission CVT includes a hydraulic pressure control system 60 including an oil pump 61, a pressure regulator valve 62, a primary pressure shift valve 63, and a secondary pressure shift valve 64. Each valve 62, 63, 64 has a solenoid valve configuration, and is configured to control a line pressure PL, primary pressure Ppri, or secondary pressure Psec, by a solenoid current applied to a solenoid 62a, 63a, 64a. Each valve 62, 63, 64 is configured to output a maximum control pressure when a command current is minimum, and output a minimum control pressure when the command current is maximum.

Pressure regulator valve 62 is configured to regulate line pressure PL based on a pump discharge pressure from oil pump 61, wherein line pressure PL is the highest one of shift pressures.

Primary pressure shift valve 63 is configured to regulate primary pressure Ppri from line pressure PL as an original pressure, wherein primary pressure Ppri is supplied to primary pressure chamber 33. For example, primary pressure Ppri is set equal to line pressure PL at a highest speed position transmission ratio, and is set such that primary pressure Ppri decreases toward the low speed position transmission ratio side.

Secondary pressure shift valve 64 is configured to regulate secondary pressure Psec from line pressure PL as an original pressure, wherein secondary pressure Psec is supplied to secondary pressure chamber 43. For example, secondary pressure Psec is set equal to line pressure PL at a lowest speed position transmission ratio, and is set such that secondary pressure Psec decreases toward the high speed position transmission ratio side.

As shown in FIG. 2, belt-type continuously variable transmission CVT includes an electronic control system including the CVT controller 15 (i.e. controller) for performing a transmission ratio control of belt-type continuously variable transmission CVT. The electronic control system includes input sensors and switches, namely, a vehicle speed sensor 81, an accelerator opening sensor 82, a CVT input rotation speed sensor 83, a CVT output rotation speed sensor 84, a primary pressure sensor 85, a secondary pressure sensor 86, an oil temperature sensor 87, and an inhibitor switch 88. CVT controller 15 is configured to receive input of information required for control via CAN communication line 20 from other on-vehicle controllers 14, 16, 17, 18 and 19, and output information required for control via CAN communication line 20 to other on-vehicle controllers 14, 16, 17, 18 and 19.

The transmission ratio control performed by CVT controller 15 is configured to: determine a target primary rotation speed (i.e. target transmission ratio) based on an operating point on a shift schedule wherein the operating point is defined by a vehicle speed VSP and an accelerator opening APO sensed by sensors 81, 82; and convert the target primary rotation speed (i.e. target transmission ratio) into a hydraulic pressure command value. The hydraulic pressure command value is further converted into an electric current command value for control of primary pressure Ppri and secondary pressure Psec (by FF control and FB control) for the transmission ratio control. During the transmission ratio control performed by CVT controller 15, a low speed position return expediting control is performed for expediting a low speed position return speed toward the lowest speed position transmission ratio, in response to a downshift request accompanying deceleration.

Figure 3:
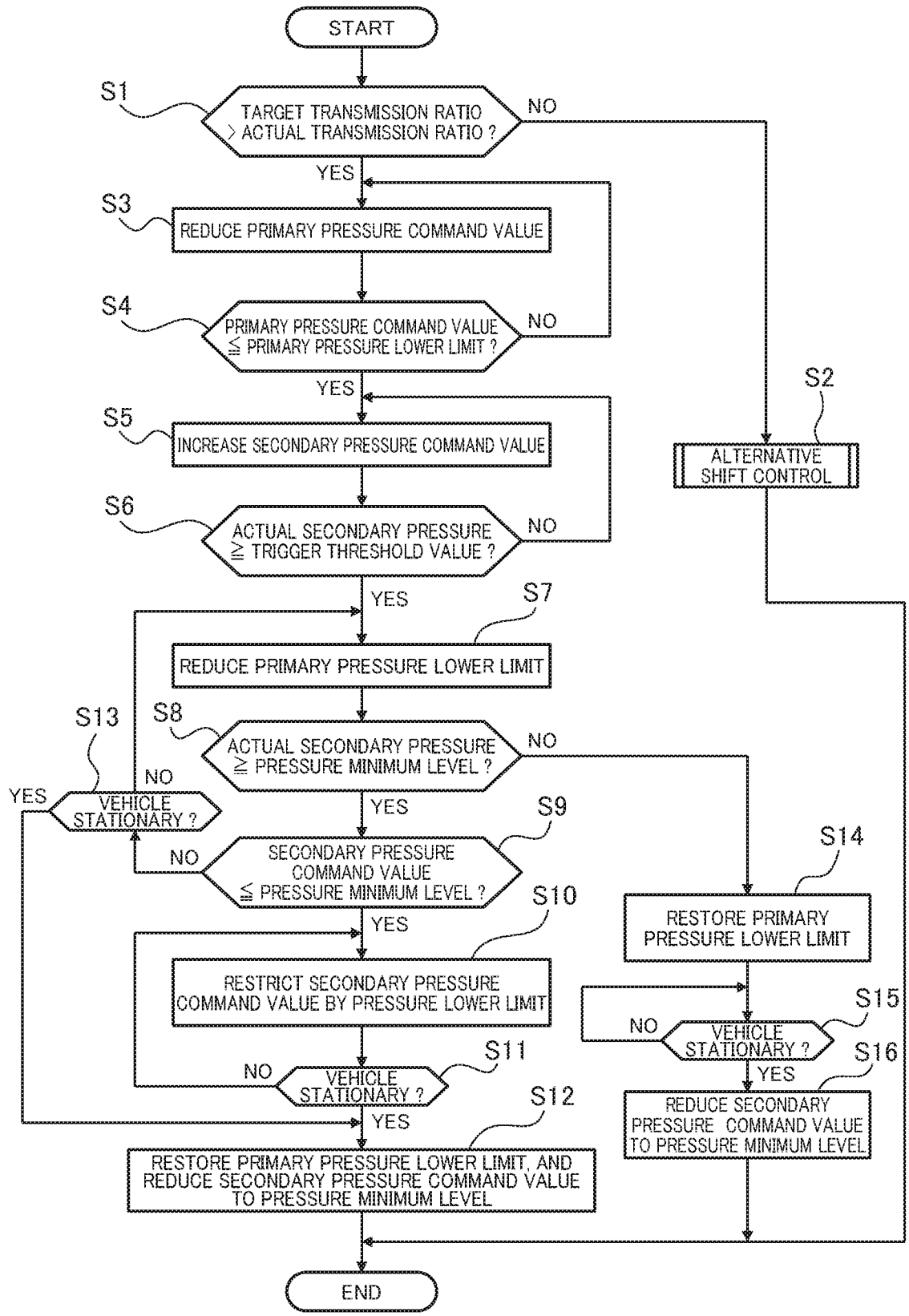
FIG. 3 is a flow chart showing a flow of low speed position return expediting control process performed by a CVT controller according to the first embodiment.

[Configuration of Process of Low Speed Position Return Expediting Control] FIG. 3 is a flow chart showing a flow of the low speed position return expediting control process performed by CVT controller 15 according to the first embodiment. The following describes steps of FIG. 3 for configuration of a process of the low speed position return expediting control.

At Step S1, CVT controller 15 determines whether or not a downshift request accompanying deceleration is present due to accelerator pedal releasing operation or brake operation when the vehicle speed is less than or equal to a predetermined level, and the target transmission ratio of belt-type continuously variable transmission CVT becomes greater than an actual transmission ratio. In case of YES (the target transmission ratio>the actual transmission ratio), CVT controller 15 proceeds to Step S3. In case of NO (the target transmission ratio≤the actual transmission ratio), CVT controller 15 proceeds to Step S2.

The target transmission ratio is determined based on the shift schedule and the operating point (APO, VSP) at the time instant. The actual transmission ratio is calculated based on an input rotation speed of belt-type continuously variable transmission CVT from CVT input rotation speed sensor 83 and an output rotation speed of belt-type continuously variable transmission CVT from CVT output rotation speed sensor 84.

At Step S2, following a determination of the target transmission ratio≤the actual transmission ratio at Step S1, CVT controller 15 performs an alternative shift control, and proceeds to an end.

When a downshift request accompanying acceleration is present due to accelerator depressing operation or the like, and the target transmission ratio>the actual transmission ratio, the alternative shift control is implemented by a downshift control for increasing the secondary pressure Psec while maintaining the primary pressure Ppri and secondary pressure Psec so as to prevent belt slipping. When the target transmission ratio=the actual transmission ratio, the alternative shift control is implemented by a control for maintaining the pulley speed ratio unchanged while maintaining the primary pressure Ppri and secondary pressure Psec so as to prevent belt slipping. When the target transmission ratio<the actual transmission ratio, the alternative shift control is implemented by an upshift control for increasing the primary pressure Ppri while maintaining the primary pressure Ppri and secondary pressure Psec so as to prevent belt slipping.

At Step S3, following a determination of the target transmission ratio>the actual transmission ratio at Step S1, or following a determination of a primary pressure command value>a primary pressure lower limit at Step S4, CVT controller 15 reduces the primary pressure command value toward the primary pressure lower limit at a predetermined gradient of decrease, and then proceeds to Step S4.

The primary pressure lower limit is a pressure value for starting the low speed position return expediting control, which is set as a target of reduction of primary pressure Ppri before start of the low speed position return expediting control. The primary pressure lower limit is set higher than a primary pressure minimum level that is set as a minimum level above which decrease of primary pressure Ppri is allowed during the low speed position return expediting control. The primary pressure minimum level is set to a minimum level required to prevent belt slipping from being caused by an input torque to primary pulley 30. Namely, the control of primary pressure Ppri is based on pressure setpoint values including the primary pressure lower limit and the primary pressure minimum level wherein the primary pressure lower limit>the primary pressure minimum level.

The minimum level required to prevent belt slipping from being caused by an input torque to primary pulley 30 is a minimum value of hydraulic pressure required to prevent slip of primary pulley 30 from being caused by an input torque as a sum of an input torque from the driving source side and an input torque from left and right driving wheels 5, 5 during braking.

At Step S4, following the reduction of the primary pressure command value at Step S3, CVT controller 15 determines whether or not the primary pressure command value is less than or equal to the primary pressure lower limit. In case of YES (the primary pressure command value≤the primary pressure lower limit), CVT controller 15 proceeds to Step S5. In case of NO (the primary pressure command value>the primary pressure lower limit), CVT controller 15 returns to Step S3.

At Step S5, following a determination of the primary pressure command value≤the primary pressure lower limit at Step S4, or following a determination of an actual secondary pressure<a trigger threshold value at Step S6, CVT controller 15 increases a secondary pressure command value toward the trigger threshold value at a predetermined gradient of increase, and then proceeds to Step S6.

At Step S6, following the increase of the secondary pressure command value at Step S5, CVT controller 15 determines whether or not the actual secondary pressure becomes greater than or equal to the trigger threshold value. In case of YES (the actual secondary pressure≥the trigger threshold value), CVT controller 15 proceeds to Step S7. In case of NO (the actual secondary pressure<the trigger threshold value), CVT controller 15 returns to Step S5.

The actual secondary pressure is acquired based on sensor information from secondary pressure sensor 86. The trigger threshold value is set to a sum of the secondary pressure lower limit and a margin of deviation of actual secondary pressure with respect to secondary pressure command value (about 0.5 Mpa, for example). The secondary pressure lower limit is set higher than a secondary pressure minimum level that is a minimum level required to prevent belt slipping from being caused by an input torque to secondary pulley 40. Namely, the control of secondary pressure Psec is based on pressure setpoint values including the trigger threshold value, the secondary pressure lower limit, and the secondary pressure minimum level in a relationship of the trigger threshold value>the secondary pressure lower limit>the secondary pressure minimum level.

The minimum level required to prevent belt slipping from being caused by an input torque to secondary pulley 40 is a minimum value of hydraulic pressure required to prevent slip of secondary pulley 40 from being caused by an input torque as a sum of an input torque from the driving source side and an input torque from left and right driving wheels 5, 5 during braking.

At Step S7, following a determination of the actual secondary pressure≥the trigger threshold value at Step S6, or following a determination at Step S13 that the vehicle is decelerating, CVT controller 15 further reduces the primary pressure lower limit toward the primary pressure minimum level at a predetermined gradient of decrease, and then proceeds to Step S8.

The reduction of the primary pressure lower limit is limited by the primary pressure minimum level, so that when the primary pressure lower limit reaches the primary pressure minimum level, the primary pressure lower limit is maintained at the primary pressure minimum level. The reduction of the primary pressure lower limit is followed by a reduction of the primary pressure command value.

At Step S8, following the reduction of the primary pressure lower limit at Step S7, CVT controller 15 determines whether or not the actual secondary pressure is greater than or equal to the secondary pressure minimum level. In case of YES (the actual secondary pressure≥the secondary pressure minimum level), CVT controller 15 proceeds to Step S9. In case of NO (the actual secondary pressure<the secondary pressure minimum level), CVT controller 15 proceeds to Step S14.

At Step S9, following a determination of the actual secondary pressure≥the secondary pressure minimum level at Step S8, CVT controller 15 determines whether or not the secondary pressure command value is less than or equal to the secondary pressure lower limit. In case of YES (the secondary pressure command value≤the secondary pressure lower limit), CVT controller 15 proceeds to Step S10. In case of NO (the secondary pressure command value>the secondary pressure lower limit), CVT controller 15 proceeds to Step S13.

At Step S10, following a determination of the secondary pressure command value≤the secondary pressure lower limit at Step S9, or following a determination at Step S11 that the vehicle is decelerating, CVT controller 15 restricts the secondary pressure command value by the secondary pressure lower limit, and then proceeds to Step S11.

The restriction of the secondary pressure command value by the secondary pressure lower limit is implemented by preventing the secondary pressure command value from falling below the secondary pressure lower limit, and maintaining the secondary pressure command value at the secondary pressure lower limit. On the other hand, after it is determined that the secondary pressure command value≤the secondary pressure lower limit, the primary pressure command value is maintained at the value when the determination is made.

At Step S11, following the restriction of the secondary pressure command value by the secondary pressure lower limit at Step S10, CVT controller 15 determines whether or not the vehicle is stationary. In case of YES (the vehicle is stationary), CVT controller 15 proceeds to Step S12. In case of NO (the vehicle is decelerating), CVT controller 15 returns to Step S10.

The determination of Step S11 is based on vehicle speed information from vehicle speed sensor 81, and is implemented by determining that the vehicle is stationary when vehicle speed VSP is less than or equal to a vehicle stationary state determination threshold value, and determining that the vehicle is decelerating when vehicle speed VSP is greater than the vehicle stationary state determination threshold value.

At Step S12, following a determination at Step S11 or S13 that the vehicle is stationary, CVT controller 15 restores the primary pressure lower limit, and reduces the secondary pressure command value to the secondary pressure minimum level at a predetermined gradient of decrease, and proceeds to the end.

The restoring of the primary pressure lower limit is implemented by restoring the primary pressure lower limit, which has been reduced at Step S7, to the pressure value for starting the low speed position return expediting control, in a stepwise manner.

At Step S13, following a determination of the secondary pressure command value>the secondary pressure lower limit at Step S9, CVT controller 15 determines whether or not the vehicle is stationary. In case of YES (the vehicle is stationary), CVT controller 15 proceeds to Step S12. In case of NO (the vehicle is decelerating), CVT controller 15 returns to Step S7.

At Step S14, following a determination of the actual secondary pressure<the secondary pressure minimum level at Step S8, CVT controller 15 restores the primary pressure lower limit, and then proceeds to Step S15.

The restoring of the primary pressure lower limit is implemented by restoring the primary pressure lower limit, which has been reduced at Step S7, to the pressure value for starting the low speed position return expediting control, in a stepwise manner.

At Step S15, following the restoring of the primary pressure lower limit at Step S14, CVT controller 15 determines whether or not the vehicle is stationary. In case of YES (the vehicle is stationary), CVT controller 15 proceeds to Step S16. In case of NO (the vehicle is decelerating), CVT controller 15 repeats the determination of Step S15.

At Step S16, following a determination at Step S15 that the vehicle is stationary, CVT controller 15 reduces the secondary pressure command value to the secondary pressure minimum level at a predetermined gradient of decrease, and then proceeds to the end.

The following describes actions of the first embodiment, separately in sections "Actions of Process of Low Speed Position Return Expediting Control", "Actions of Low Speed Position Return Expediting Control by Comparative Example", "Actions of Low Speed Position Return Expediting Control by First Embodiment", and "Characteristic Actions of Low Speed Position Return Expediting Control".

[Actions of Process of Low Speed Position Return Expediting Control] The following describes actions of the process of low speed position return expediting control with reference to a flow chart of FIG. 3. When it is not a downshift request accompanying deceleration, the process proceeds as Step S1->Step S2->the end in the flow chart of FIG. 3. At Step S2, a power-on downshift control or a transmission ratio maintenance control or an upshift control is performed.

In response to presence of a downshift request accompanying deceleration due to accelerator pedal releasing operation or brake operation, the process proceeds as Step S1->Step S3->Step S4 in the flow chart of FIG. 3. While it is determined at Step S4 that the primary pressure command value>the primary pressure lower limit, the flow of Step S3->Step S4 is repeated. In this situation, at Step S3, the primary pressure command value is controlled to decrease toward the primary pressure lower limit at the predetermined gradient of decrease.

When the primary pressure command value reaches the primary pressure lower limit, and it is determined at Step S4 that the primary pressure command value≥the primary pressure lower limit, the process proceeds as Step S4->Step S5->Step S6. While it is determined at Step S6 that the actual secondary pressure<the trigger threshold value, the flow of Step S5->Step S6 is repeated. In this situation, at Step S5, the secondary pressure command value is controlled to increase toward the trigger threshold value at the predetermined gradient of increase.

When the actual secondary pressure reaches the trigger threshold value, and it is determined at Step S6 that the actual secondary pressure≥the trigger threshold value, the process proceeds as Step S6->Step S7->Step S8->Step S9. In this situation, at Step S7, in response to the condition of the actual secondary pressure the trigger threshold value as a start condition, the low speed position return expediting control starts to be performed to reduce the primary pressure lower limit toward the primary pressure minimum level at the predetermined gradient of decrease.

When the actual secondary pressure fails to reach the secondary pressure minimum level, and the secondary pressure command value fails to reach the secondary pressure lower limit in a situation of rapid deceleration or the like, the flow of Step S7->Step S8->Step S9->Step S13 is repeated while it is determined that the secondary pressure command value>the secondary pressure lower limit. In this situation, at Step S7, the low speed position return expediting control is performed to reduce the primary pressure command value toward the primary pressure minimum level. When it is determined at Step S13 that the vehicle is stationary, the process proceeds as Step S13->Step S12->the end. At Step S12, the primary pressure lower limit is restored, and the secondary pressure command value is controlled to decrease to the secondary pressure minimum level at the predetermined gradient of decrease.

On the other hand, when the secondary pressure command value reaches the secondary pressure lower limit before the secondary pressure command value reaches the secondary pressure minimum level in a situation of slow deceleration or the like, the flow of Step S7->Step S8->Step S9->Step S13 is repeated while it is determined that the secondary pressure command value>the secondary pressure lower limit. In this situation, at Step S7, the low speed position return expediting control is performed to reduce the primary pressure command value toward the primary pressure minimum level.

When it is determined at Step S9 that the secondary pressure command value the secondary pressure lower limit, the process proceeds as Step S9->Step S10->Step S11. While it is determined at Step S11 that the vehicle is decelerating, the flow of Step S10->Step S11 is repeated. In this situation, at Step S10, the secondary pressure command value is restricted by the secondary pressure lower limit, and thereby maintained at the secondary pressure lower limit. On the other hand, when it is determined that the secondary pressure command value≤the secondary pressure lower limit, the primary pressure command value is thereafter maintained at the value when the determination is made.

When it is determined at Step S11 that the vehicle is stationary, the process proceeds from Step S11 to Step S12. At Step S12, the primary pressure lower limit is restored, and the secondary pressure command value is controlled to decrease to the secondary pressure minimum level at the predetermined gradient of decrease. On the other hand, the restoring of the primary pressure lower limit causes the primary pressure command value to be restored to the value when the low speed position return expediting control is started.

In a situation of deceleration where oil quantity balance of oil pump 61 is short, when the actual secondary pressure reaches the secondary pressure minimum level before the secondary pressure command value reaches the secondary pressure lower limit, the process proceeds as Step S8->Step S14->Step S15. Namely, when it is determined that the actual secondary pressure<the secondary pressure minimum level during the reduction of the primary pressure lower limit, the primary pressure lower limit is controlled to be restored, to restore the primary pressure command value to the value when the low speed position return expediting control is started, in a stepwise manner, at Step S14. Then, when it is determined at Step S15 that the vehicle is stationary, the process proceeds from Step S15 to Step S16. At Step S16, the secondary pressure command value is controlled to decrease to the secondary pressure minimum level at the predetermined gradient of decrease.

In this way, in a situation of rapid deceleration or the like, when the actual secondary pressure fails to reach the secondary pressure minimum level and the secondary pressure command value fails to reach the secondary pressure lower limit after the condition for starting the low speed position return expediting control is satisfied, the normal low speed position return expediting control is performed. Namely, the low speed position return expediting control is implemented by reducing the primary pressure lower limit while increasing the secondary pressure command value.

On the other hand, in a situation of slow deceleration or the like, when the secondary pressure command value reaches the secondary pressure lower limit before the actual secondary pressure reaches the secondary pressure minimum level after the condition for starting the low speed position return expediting control is satisfied, the reduction of the secondary pressure command value and the reduction of the primary pressure command value are restricted. Namely, when it is determined that the secondary pressure command value the secondary pressure lower limit during the low speed position return expediting control, the secondary pressure command value is then maintained at the secondary pressure lower limit, and the primary pressure command value is then maintained at the value when the determination is made.

On the other hand, in a situation of deceleration with shortage of oil quantity balance, when the actual secondary pressure reaches the secondary pressure minimum level before the secondary pressure command value reaches the secondary pressure lower limit, a control for preventing belt slipping (for protection of components) is performed with higher priority to the low speed position return expediting control. Namely, when it is determined that the actual secondary pressure<the secondary pressure minimum level, the primary pressure lower limit is restored in a stepwise manner, thereby terminating the low speed position return expediting control.

Figure 4:
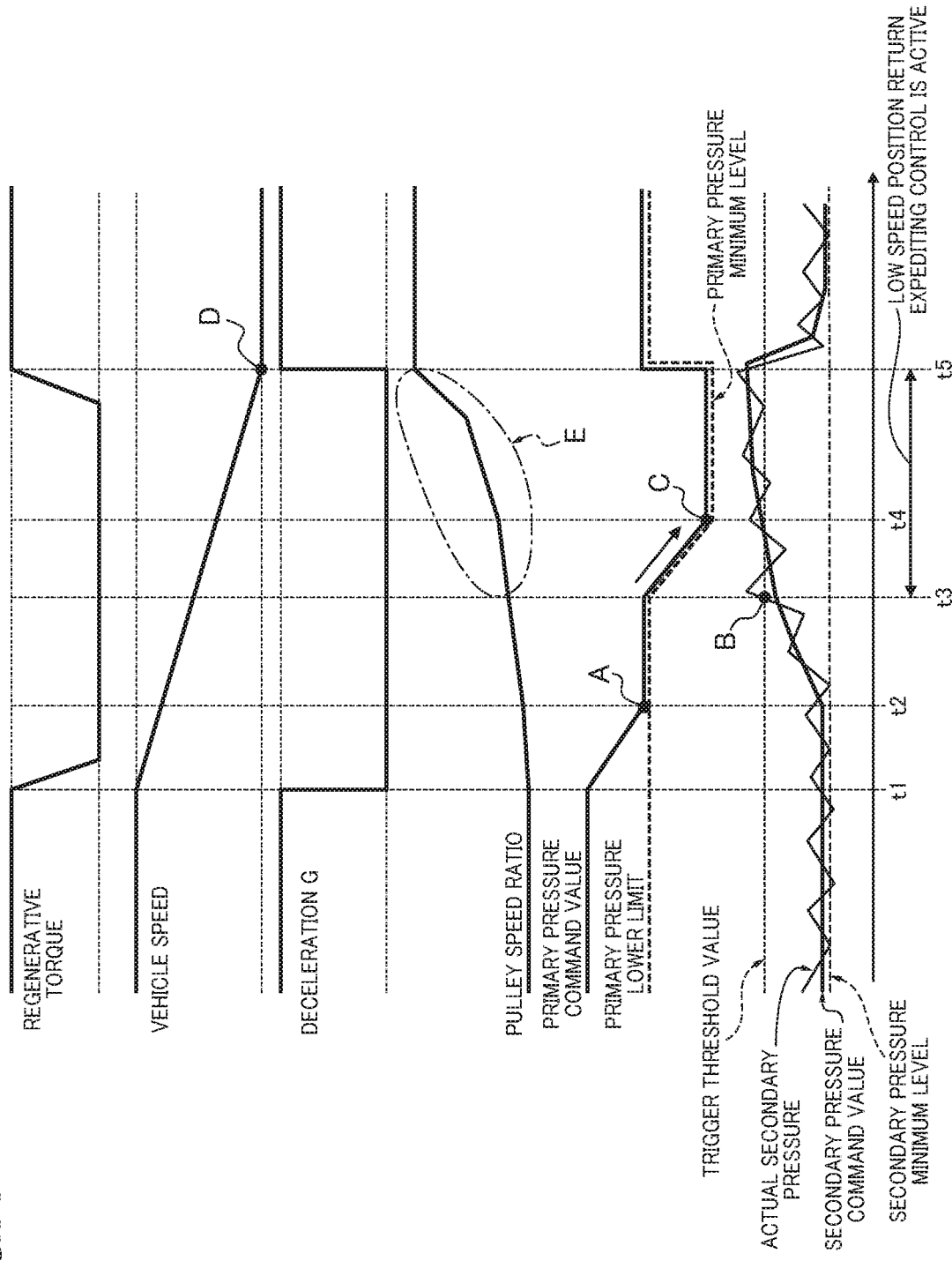
FIG. 4 is a time chart showing characteristics of regenerative torque, vehicle speed, pulley speed ratio, primary pressure command value, secondary pressure command value, and actual secondary pressure when a low speed position return expediting control is performed under rapid deceleration according to a comparative example.

[Actions of Low Speed Position Return Expediting Control by Comparative Example] FIG. 4 is a time chart showing characteristics of quantities when a low speed position return expediting control is performed under rapid deceleration according to a comparative example where no secondary pressure lower limit is set for the low speed position return expediting control. The following describes the low speed position return expediting control according to the comparative example under rapid deceleration with reference to FIG. 4.

At a time instant t1 when downshifting is started, a regenerative torque causes a large deceleration G to start to reduce the vehicle speed, and the primary pressure command value starts to be reduced. Then, the primary pressure command value decreases at the predetermined gradient, and at a time instant t2, reaches the primary pressure lower limit (as indicated by point A in FIG. 4), and is maintained at the primary pressure lower limit during a time period from time instant t2 to a time instant t3. On the other hand, the secondary pressure command value is comparable to the secondary pressure minimum level until time instant t2, and starts to be increased to a point of time instant t3.

At time instant t3 when the actual secondary pressure reaches the trigger threshold value (as indicated by point B in FIG. 4), the primary pressure command value starts to be reduced from the primary pressure lower limit toward the primary pressure minimum level. Thereafter, at a time instant t4, the primary pressure command value reaches the primary pressure minimum level (as indicated by point C in FIG. 4), and is maintained at the primary pressure minimum level during a time period from time instant t4 to a time instant t5. On the other hand, the secondary pressure command value is further increased during the time period from time instant t4 to time instant t5. At time instant t5 when the vehicle gets stationary (as indicated by point D in FIG. 4), the primary pressure command value is restored to the primary pressure lower limit, whereas the secondary pressure command value is made to decrease from the value at time instant t5 toward the secondary pressure minimum level at the predetermined gradient of decrease.

In this way, in a situation of rapid deceleration, the low speed position return expediting control for reduction of the primary pressure command value below the primary pressure lower limit is active during the time period from time instant t3 to time instant t5. Accordingly, the low speed position return expediting control causes the shift speed to increase toward the lowest speed position transmission ratio in an accelerated manner, as shown in an area indicated by an arrow E in FIG. 4 about characteristics of the pulley speed ratio.

Figure 5:
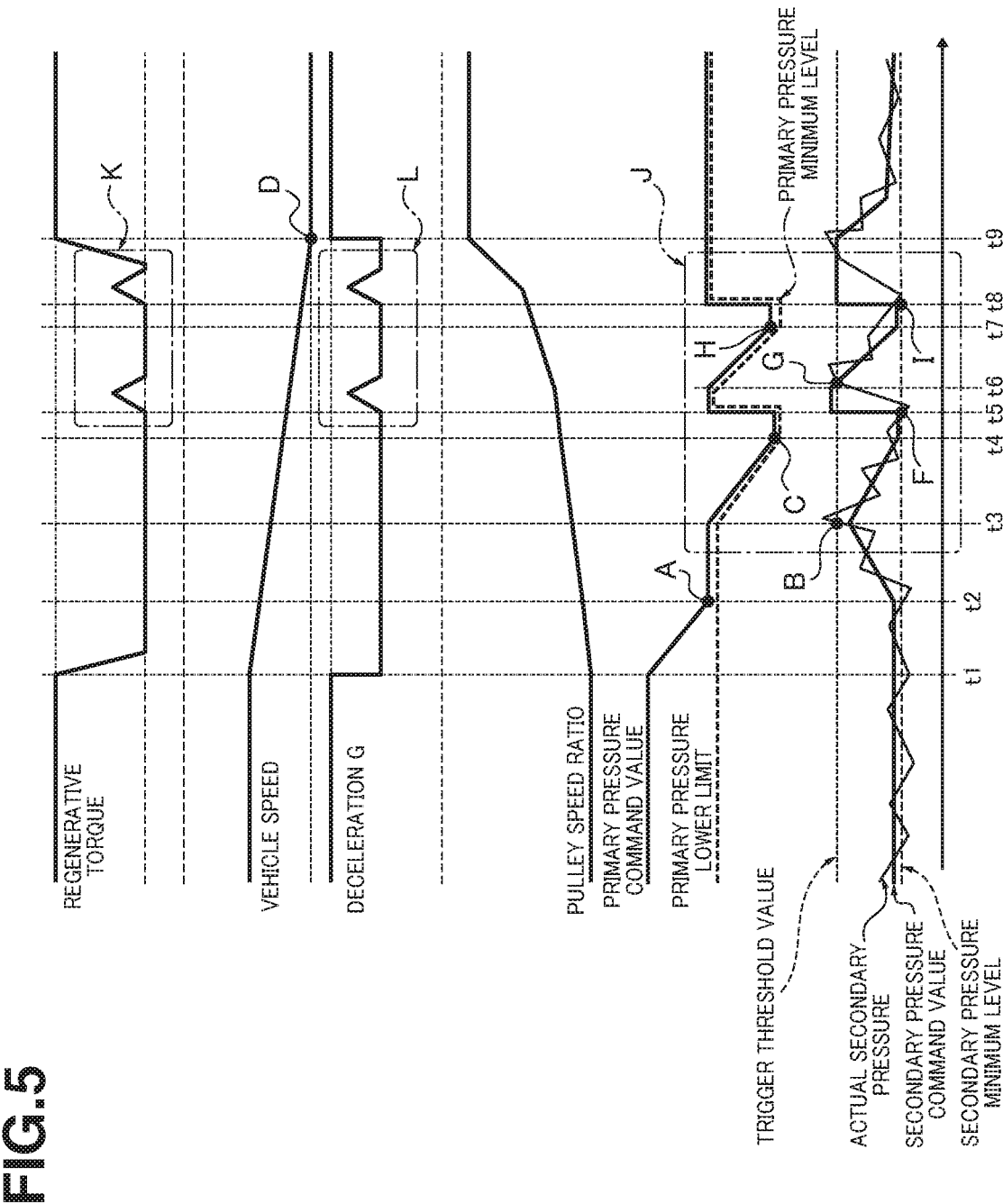
FIG. 5 is a time chart showing characteristics of regenerative torque, vehicle speed, pulley speed ratio, primary pressure command value, secondary pressure command value, and actual secondary pressure when the low speed position return expediting control is performed under slow deceleration according to the comparative example.

FIG. 5 is a time chart showing characteristics of quantities when the low speed position return expediting control is performed under slow deceleration according to the comparative example. The following describes the low speed position return expediting control according to the comparative example under slow deceleration with reference to FIG. 5.

At a time instant t1 when downshifting is started, a regenerative torque causes a large deceleration G to start to reduce the vehicle speed, and the primary pressure command value starts to be reduced. Then, the primary pressure command value decreases at the predetermined gradient, and at a time instant t2, reaches the primary pressure lower limit (as indicated by point A in FIG. 5), and is maintained at the primary pressure lower limit during a time period from time instant t2 to a time instant t3. On the other hand, the secondary pressure command value is comparable to the secondary pressure minimum level until time instant t2, and starts to be increased to a point of time instant t3.

At time instant t3 when the actual secondary pressure reaches the trigger threshold value (as indicated by point B in FIG. 5), the primary pressure command value starts to be reduced from the primary pressure lower limit toward the primary pressure minimum level. Thereafter, at a time instant t4, the primary pressure command value reaches the primary pressure minimum level (as indicated by point C in FIG. 5). In the situation of slow deceleration, in order to prevent the low speed position return shifting from becoming excessive by the reduction of the primary pressure command value, the secondary pressure command value is reduced, so that the actual secondary pressure reaches the secondary pressure minimum level at a time instant t5 (as indicated by point F in FIG. 5). Accordingly, at time instant t5, the low speed position return expediting control is terminated, and the primary pressure command value is restored to the primary pressure lower limit in a stepwise manner, and the secondary pressure command value is restored to the trigger threshold value in a stepwise manner.

When the actual secondary pressure reaches the trigger threshold value at a time instant t6 (as indicated by point G in FIG. 5) in response to the restoring of the secondary pressure command value, the low speed position return expediting control is restarted so that the primary pressure command value starts to be reduced from the primary pressure lower limit toward the primary pressure minimum level. Thereafter, at a time instant t7, the primary pressure command value reaches the primary pressure minimum level (as indicated by point H in FIG. 5). In the situation of slow deceleration, in order to prevent the low speed position return shifting from becoming excessive by the reduction of the primary pressure command value, the secondary pressure command value is reduced, so that the actual secondary pressure reaches the secondary pressure minimum level at a time instant t8 immediately after time instant t7 (as indicated by point I in FIG. 5). Accordingly, at time instant t8, the low speed position return expediting control is terminated, and the primary pressure command value is restored to the primary pressure lower limit in a stepwise manner, and the secondary pressure command value is restored to the trigger threshold value in a stepwise manner.

Then, at a time instant t9 when the vehicle gets stationary (as indicated by point D in FIG. 5), the secondary pressure command value is made to decrease from the trigger threshold value toward the secondary pressure minimum level at the predetermined gradient of decrease.

In this way, in such a situation of slow deceleration, the low speed position return expediting control is active during the time period from time instant t3 to time instant t5 and is thereafter active again during the time period from time instant t6 to time instant t8, wherein activation of the low speed position return expediting control is repeated. Accordingly, as shown by an area indicated by an arrow 3 in FIG. 5 about characteristics of the primary pressure and the secondary pressure, the primary pressure command value fluctuates between the primary pressure lower limit and the primary pressure minimum level, and the secondary pressure command value fluctuates between the trigger threshold value and the secondary pressure minimum level.

The low speed position return expediting control is performed based on a condition that secondary pressure Psec does not allow slipping of pulley belt 50 (i.e. the actual secondary pressure≥the trigger threshold value). Accordingly, when secondary pressure Psec is increased to prevent belt slipping, the condition of the actual secondary pressure≥the trigger threshold value is satisfied, so that the low speed position return expediting control is restarted to reduce the primary pressure Ppri. This reduces secondary pressure Psec again. When secondary pressure Psec decreases to the pressure minimum level, the low speed position return expediting control is terminated, so that primary pressure Ppri and secondary pressure Psec are increased for prevention of belt slipping. In this way, hunting of hydraulic pressure occurs where primary pressure Ppri and secondary pressure Psec thus fluctuate repeatedly.

Furthermore, the regeneration control under deceleration includes a control of restoring the regenerative torque when the deviation between the secondary pressure command value and the actual secondary pressure becomes greater than or equal to a predetermined level. This causes an interruption of operation of reducing the regenerative torque temporarily immediately after time instant t5 and immediately after time instant t8 as shown by an area indicated by an arrow K in FIG. 5 about characteristics of the regenerative torque. The temporary reduction of the regenerative torque causes the deceleration G to fluctuate as shown by an area indicated by an arrow L in FIG. 5 about characteristics of the deceleration G.

When the secondary pressure command value is increased in a stepwise manner to increase the secondary pressure Psec to prevent belt slipping, the actual secondary pressure increases with a delay with respect to the secondary pressure command value, so that the actual secondary pressure deviates from the secondary pressure command value. In this situation, secondary pressure Psec is short from the pressure command value, and it is determined that a differential thrust for shifting for the low speed position return is insufficient, and the regenerative torque of motor generator 3 is reduced. This reduces a component of secondary pressure Psec for power transmission, and thereby increase a component for the differential thrust for shifting. Accordingly, every time secondary pressure Psec is increased to prevent belt slipping, a reduction of the regenerative toque occurs. This causes hunting of hydraulic pressure as described above, and causes repetition of the reduction and restoring of the regenerative torque, and thereby cause a problem that a driver feels uncomfortable due to repeated shocks.

Figure 6:
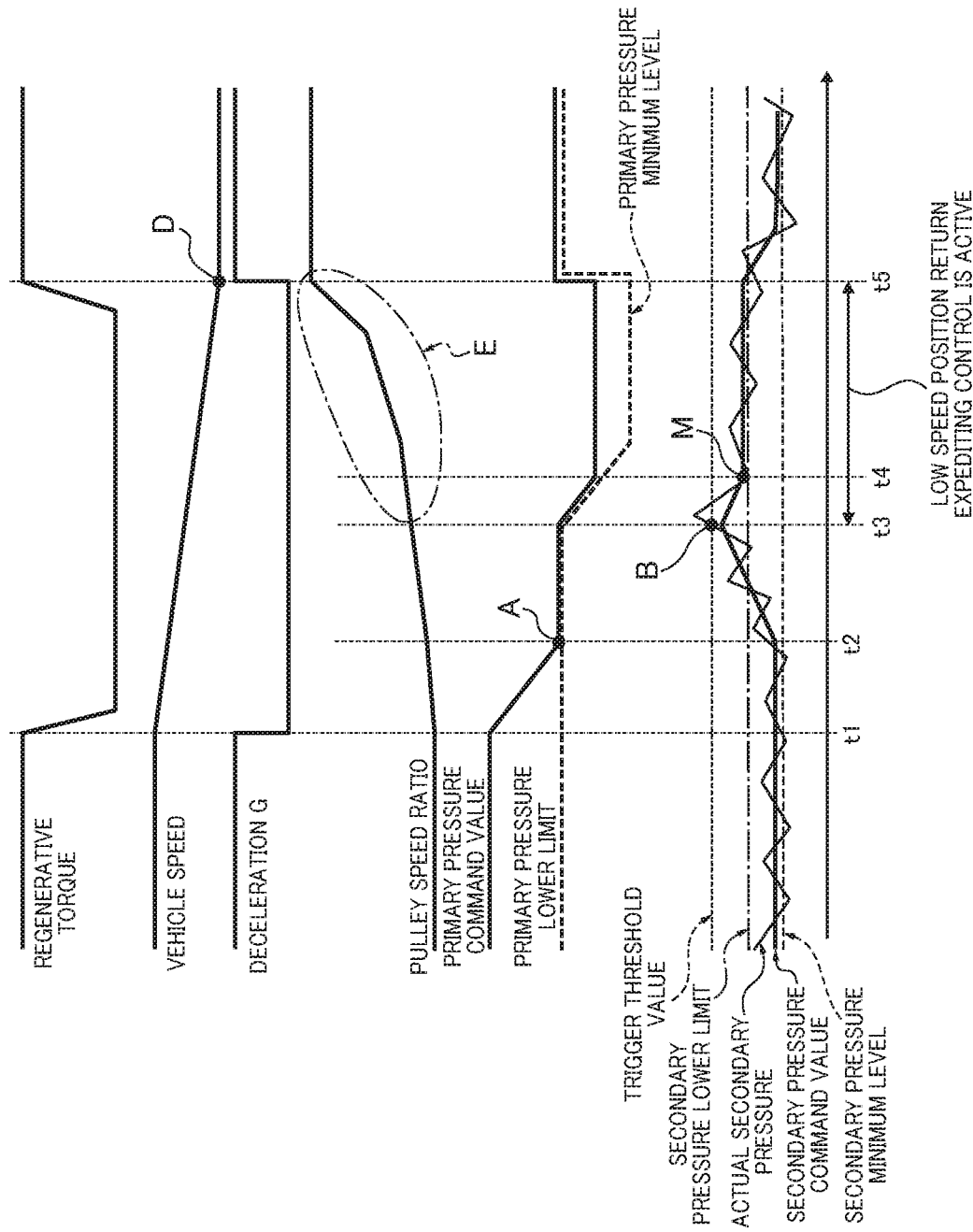
FIG. 6 is a time chart showing characteristics of regenerative torque, vehicle speed, pulley speed ratio, primary pressure command value, secondary pressure command value, and actual secondary pressure when the low speed position return expediting control is performed under slow deceleration where a secondary pressure command value decreases, according to the first embodiment.

[Actions of Low Speed Position Return Expediting Control by First Embodiment] FIG. 6 is a time chart showing characteristics of quantities when the low speed position return expediting control is performed under slow deceleration where the secondary pressure command value decreases, according to the first embodiment. The following describes actions of the low speed position return expediting control according to the first embodiment under slow deceleration with reference to FIG. 6.

At a time instant t1 when downshifting is started, a regenerative torque causes a large deceleration G to start to reduce the vehicle speed, and the primary pressure command value starts to be reduced. Then, the primary pressure command value decreases at the predetermined gradient, and at a time instant t2, reaches the primary pressure lower limit (as indicated by point A in FIG. 6), and is maintained at the primary pressure lower limit during a time period from time instant t2 to a time instant t3. On the other hand, the secondary pressure command value is comparable to the secondary pressure minimum level until time instant t2, and starts to be increased to a point of time instant t3.

At time instant t3 when the actual secondary pressure reaches the trigger threshold value (as indicated by point B in FIG. 6), and the primary pressure command value starts to be reduced from the primary pressure lower limit toward the primary pressure minimum level. In the situation of slow deceleration, the secondary pressure command value starts to be reduced at a time instant t3, in order to prevent the low speed position return shifting from becoming excessive by the reduction of the primary pressure command value, and the secondary pressure command value reaches the secondary pressure lower limit at a time instant t4 (as indicated by point M in FIG. 6). Accordingly, the secondary pressure command value is maintained at the secondary pressure lower limit by restriction by the secondary pressure lower limit during a time period from time instant t4 to a time instant t5. On the other hand, the primary pressure command value is maintained at the value obtained at time instant t4 when the secondary pressure command value reaches the secondary pressure lower limit (>the primary pressure minimum level).

Then, at time instant t5 when the vehicle gets stationary (as indicated by point D in FIG. 6), the primary pressure command value is restored from that value to the primary pressure lower limit, and the secondary pressure command value is caused to decrease from the secondary pressure lower limit toward the secondary pressure minimum level at the predetermined gradient of decrease.

In this way, in such a situation of slow deceleration, the low speed position return expediting control for reduction of the primary pressure command value below the primary pressure lower limit is active during the time period from time instant t3 to time instant t5. Accordingly, the low speed position return expediting control causes the shift speed to increase toward the lowest speed position transmission ratio in an accelerated manner, as shown in an area indicated by an arrow E in FIG. 6 about characteristics of the pulley speed ratio. Namely, according to the first embodiment, even in the situation of slow deceleration, the low speed position return expediting control behaves as in FIG. 4 for rapid deceleration.

Furthermore, as compared to the situation of slow deceleration in the comparative example (FIG. 5), the situation of slow deceleration in the first embodiment (FIG. 6) causes no hydraulic pressure hunting and no regenerative torque shocks as in the comparative example.

Figure 7:
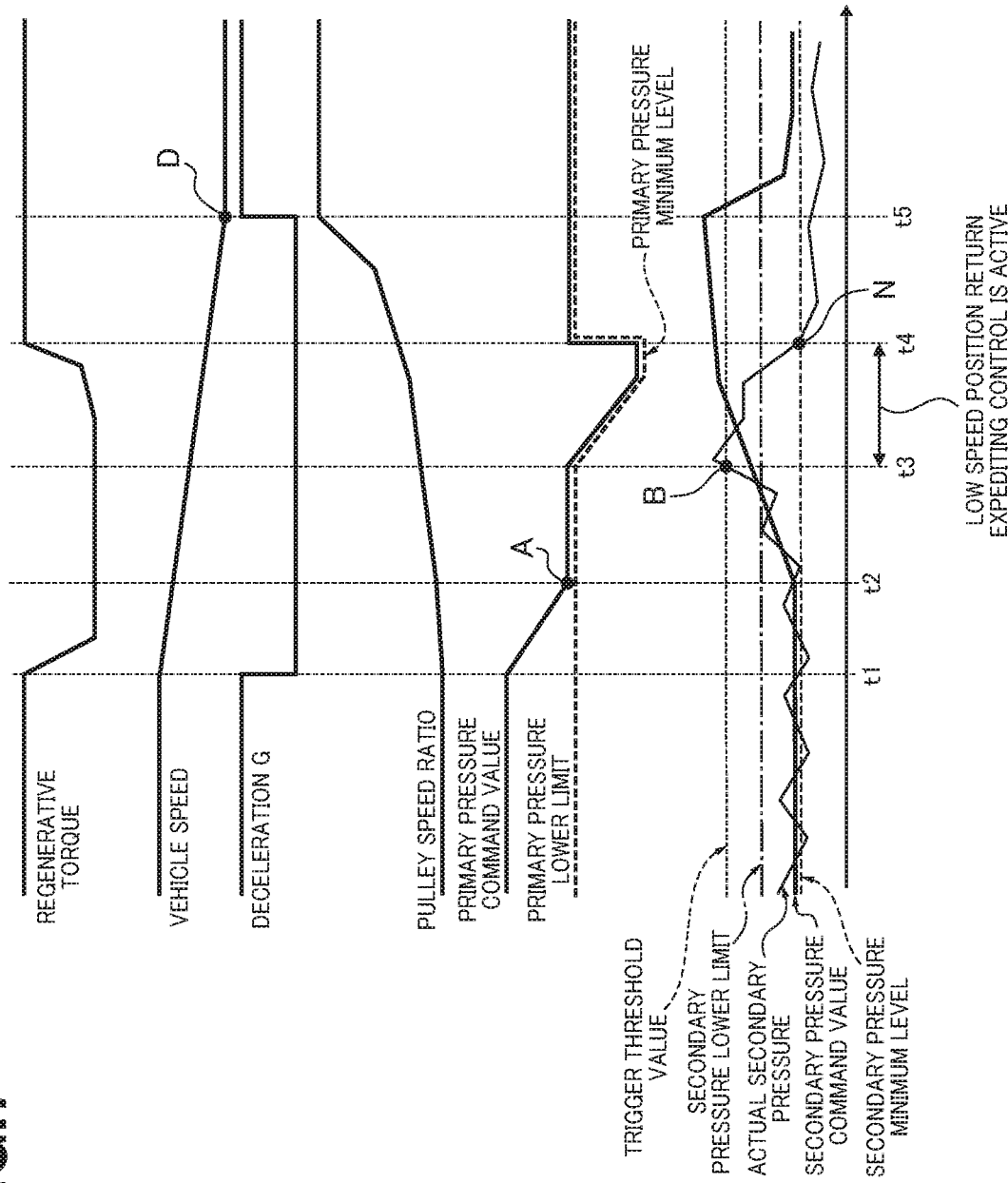
FIG. 7 is a time chart showing characteristics of regenerative torque, vehicle speed, pulley speed ratio, primary pressure command value, secondary pressure command value, and actual secondary pressure when the low speed position return expediting control is performed under deceleration where the secondary pressure command value decreases to a pressure minimum level, according to the first embodiment.

FIG. 7 is a time chart showing characteristics of quantities when the low speed position return expediting control is performed under deceleration where the secondary pressure command value decreases to the pressure minimum level, according to the first embodiment.

At a time instant t1 when downshifting is started, a regenerative torque causes a large deceleration G to start to reduce the vehicle speed, and the primary pressure command value starts to be reduced. Then, the primary pressure command value decreases at the predetermined gradient, and at a time instant t2, reaches the primary pressure lower limit (as indicated by point A in FIG. 7), and is maintained at the primary pressure lower limit during a time period from time instant t2 to a time instant t3. On the other hand, the secondary pressure command value is comparable to the secondary pressure minimum level until time instant t2, and starts to be increased to a point of time instant t3.

At time instant t3 when the actual secondary pressure reaches the trigger threshold value (as indicated by point B in FIG. 7), the primary pressure command value starts to be reduced from the primary pressure lower limit toward the primary pressure minimum level. The secondary pressure command value is further increased in succession to the increase started at time instant t2. However, when the actual secondary pressure starts to decrease at time instant t3 even with the increase of the secondary pressure command value, due to oil quantity balance shortage or the like, the actual secondary pressure reaches the secondary pressure minimum level at a time instant t4 (as indicated by point N in FIG. 7). Accordingly, at time instant t4, the low speed position return expediting control is terminated, and the primary pressure command value is restored to the primary pressure lower limit. On the other hand, the secondary pressure command value is caused to increase at a slow gradient for advancing the low speed position shifting.

Then, at time instant t5 when the vehicle gets stationary (as indicated by point D in FIG. 7), the secondary pressure command value is caused to decrease from the value at time instant t5 toward the secondary pressure minimum level at the predetermined gradient of decrease.

In this way, in such a pattern of situation of deceleration where the actual secondary pressure falls to the secondary pressure minimum level during the low speed position return expediting control, the low speed position return expediting control for reduction of the primary pressure command value below the primary pressure lower limit is active during the time period from time instant t3 to time instant t4 as shown in FIG. 7.

Namely, the setting of the secondary pressure lower limit serves to prevent the actual secondary pressure from falling below the secondary pressure lower limit, and thereby prevent the actual secondary pressure from becoming equal to the secondary pressure minimum level. However, for some reason such as oil quantity balance shortage due to low rotation speed of oil pump 61, it is possible that the actual secondary pressure falls to the secondary pressure minimum level although the secondary pressure command value has not yet fallen to the secondary pressure lower limit. In this situation, when the actual secondary pressure decreases to the secondary pressure minimum level, the low speed position return expediting control is terminated to increase the primary pressure command value and the secondary pressure command value. At this moment, the primary pressure command value is increased to the primary pressure lower limit from the value that is obtained by the decrease toward the primary pressure minimum level by the low speed position return expediting control. With the increase of the actual primary pressure, the secondary pressure command value is increased to a balanced point for controlling the transmission ratio to a value corresponding to the current operating state, thereby ensuring the low speed position return shifting.

[Characteristic Actions of Low Speed Position Return Expediting Control] According to the first embodiment, the control device for belt-type continuously variable transmission CVT is configured to set the secondary pressure lower limit higher than the secondary pressure minimum level in the low speed position return expediting control, wherein the secondary pressure lower limit is a lower limit of secondary pressure Psec, and the secondary pressure minimum level is a level required to prevent belt slipping from being caused by an input torque to secondary pulley 40.

This serves to prevent the secondary pressure Psec from falling below the secondary pressure lower limit, even when in a situation of slow deceleration, the reduction of the primary pressure Ppri is excessive for the low speed position return expediting control, and the secondary pressure Psec is reduced to prevent the low speed position shifting from becoming excessive. Namely, the secondary pressure Psec is prevented from decreasing to the secondary pressure minimum level.

Accordingly, the secondary pressure Psec does not fall to the secondary pressure minimum level even in the situation of slow deceleration, preventing the primary pressure Ppri and secondary pressure Psec from being increased by termination of the low speed position return expediting control. This serves to prevent the occurrence of hydraulic pressure hunting where primary pressure Ppri and secondary pressure Psec increase and decrease repeatedly, even during downshifting in the situation of slow deceleration.

According to the first embodiment, the secondary pressure lower limit is set to a sum of the secondary pressure minimum level and a margin of deviation of actual secondary pressure with respect to secondary pressure command value. Namely, the actual secondary pressure deviates by an amount of vibration with respect to secondary pressure command value. The secondary pressure lower limit can be set to prevent the actual secondary pressure from becoming equal to the secondary pressure minimum level even with a deviation. This serves to prevent reliably hydraulic pressure hunting in the situation of slow deceleration, and further serves to allow the secondary pressure lower limit to be set minimally low.

The first embodiment is configured to: determine whether a first condition is satisfied where the secondary pressure command value becomes less than or equal to the secondary pressure lower limit after starting the low speed position return expediting control for reduction of the primary pressure lower limit; and in response to a determination that the first condition is satisfied, maintain the primary pressure command value at a value when the determination is made, and restrict the secondary pressure command value by the secondary pressure lower limit. Namely, when the restricting control based on the secondary pressure lower limit is implemented by maintaining the primary pressure command value and the secondary pressure command value when it is determined that the secondary pressure command value becomes lower than or equal to the secondary pressure lower limit. Accordingly, in the situation of slow deceleration, the primary pressure command value is maintained at the value when the determination is made, thereby preventing the margin of reduction of primary pressure Ppri from being excessive. On the other hand, the restriction of the secondary pressure command value by the secondary pressure lower limit serves to prevent the margin of reduction of the secondary pressure Psec from being excessive. Namely, this feature serves to stabilize the speed of progress of the low speed position shifting, and also adjust the margin of reduction of the primary pressure Ppri and the margin of reduction of secondary pressure Psec and thereby set the low speed position return speed suitable to the deceleration G. Therefore, when the restricting control based on the secondary pressure lower limit is started, the low speed position return speed can be set to a stable value corresponding to the magnitude of deceleration G.

The first embodiment is configured to: determine whether a second condition is satisfied where the actual secondary pressure becomes less than the secondary pressure minimum level before the secondary pressure command value becomes less than the secondary pressure lower limit after starting the low speed position return expediting control for reduction of the primary pressure lower limit; and in response to a determination that the second condition is satisfied, restore the primary pressure. For example, when the rotation speed of oil pump 61 is low, shortage of oil quantity balance or the like may cause the actual secondary pressure to decrease to the secondary pressure minimum level although the secondary pressure command value does not decrease to the secondary pressure lower limit. In this situation, the low speed position return expediting control is terminated and the primary pressure lower limit is controlled to be immediately restored. In this way, when the actual secondary pressure falls below the secondary pressure minimum level, the prevention of belt slipping is prioritized to the low speed position return expediting control, thereby ensuring reliability of endurance by protection of components such as primary pulley 30, secondary pulley 40, and pulley belt 50.

The first embodiment is configured to: set the trigger threshold value to a sum of the secondary pressure lower limit and a margin of deviation of actual secondary pressure with respect to secondary pressure command value; and start the reduction of the primary pressure lower limit in response to a condition that the actual secondary pressure becomes greater than or equal to the trigger threshold value during downshifting. The actual secondary pressure deviates from the secondary pressure command value. Namely, in some situations, the actual secondary pressure is temporarily higher than the secondary pressure command value. In consideration of this situation, the trigger threshold value of the low speed position return expediting control is set to the sum of the secondary pressure lower limit and the margin of deviation. This serves to maintain the secondary pressure command value greater than or equal to the secondary pressure lower limit when the actual secondary pressure becomes greater than or equal to the trigger threshold value of the low speed position return expediting control, and thereby control the primary pressure lower limit to further reduce the primary pressure lower limit until the secondary pressure command value reaches the secondary pressure lower limit. In the situation of slow deceleration, this allows the low speed position return expediting control to be performed for reduction of primary pressure Ppri after the start condition for the low speed position return expediting control is satisfied.

The following describes effects produced by the control device for belt-type continuously variable transmission CVT according to the first embodiment.

<1> A continuously variable transmission control device for a continuously variable transmission (CVT), wherein the continuously variable transmission (CVT) includes a primary pulley (30), a secondary pulley (40), and a pulley belt (50), wherein the pulley belt (50) is structured to transmit power between the primary pulley (30) and the secondary pulley (40), and wherein the continuously variable transmission (CVT) is configured to implement a shift control for shifting a pulley speed ratio by control of a primary pressure (Ppri) supplied to the primary pulley (30) and a secondary pressure (Psec) supplied to the secondary pulley (40), the continuously variable transmission control device includes: a controller (CVT controller 15) configured to: perform a low speed position return expediting control for increasing a differential pressure between the primary pressure (Ppri) and the secondary pressure (Psec) at least by reducing the primary pressure (Ppri) in response to a downshift request accompanying deceleration; and set a secondary pressure lower limit higher than a secondary pressure minimum level during the low speed position return expediting control, wherein the secondary pressure lower limit is a lower limit value of the secondary pressure (Psec), and wherein the secondary pressure minimum level is a level required to prevent belt slipping from being caused by an input torque to the secondary pulley (40). This configuration serves to prevent the occurrence of hydraulic pressure hunting where primary pressure Ppri and secondary pressure Psec fluctuate repeatedly, during the low speed position return expediting control under the downshift accompanying deceleration.

<2> The controller (CVT controller 15) is configured to set the secondary pressure lower limit to a sum of the secondary pressure minimum level and a margin of deviation of actual secondary pressure with respect to secondary pressure command value. This feature serves to reliably prevent the occurrence of pulley hydraulic pressure hunting, and also set the secondary pressure lower limit minimally low, in the slow deceleration situation, in addition to the effect of <1>.

<3> The controller (CVT controller 15) is configured to: determine whether a first condition is satisfied where a secondary pressure command value becomes less than or equal to the secondary pressure lower limit after starting the low speed position return expediting control for reduction of the primary pressure (Ppri, the primary pressure lower limit); and in response to a determination that the first condition is satisfied, maintain a primary pressure command value at a value when the determination is made, and restrict the secondary pressure command value by the secondary pressure lower limit. This feature serves to start the restricting control based on the secondary pressure lower limit, and thereby set the low speed position return speed to a stable value corresponding to the magnitude of deceleration G, in addition to the effect of <1> or <2>.

<4> The controller (CVT controller 15) is configured to: determine whether a second condition is satisfied where an actual secondary pressure becomes less than the secondary pressure minimum level before the secondary pressure command value becomes less than the secondary pressure lower limit after starting the low speed position return expediting control for reduction of the primary pressure (Ppri, the primary pressure lower limit); and in response to a determination that the second condition is satisfied, restore the primary pressure (Ppri, the primary pressure lower limit). When the actual secondary pressure falls below the secondary pressure minimum level, this feature serves to prioritize the prevention of belt slipping to the low speed position return expediting control, thereby ensuring reliability of endurance by protection of components such as primary pulley 30, secondary pulley 40, and pulley belt 50, in addition to the effect of <3>.

<5> The controller (CVT controller 15) is configured to: set a trigger threshold value to a sum of the secondary pressure lower limit and a margin of deviation of actual secondary pressure with respect to secondary pressure command value; and start the reduction of the primary pressure (Ppri, the primary pressure lower limit) in response to a condition that an actual secondary pressure becomes greater than or equal to the trigger threshold value during downshifting. This feature serves to ensure the execution of the low speed position return expediting control for reduction of the primary pressure Ppri after satisfaction of the start condition for the low speed position return expediting control in the situation of slow deceleration, in addition to the effect of <1> to <4>.

Second Embodiment

The second embodiment is configured to set the secondary pressure lower limit equal to the trigger threshold value, whereas the first embodiment is configured to set the relationship of the trigger threshold value>the secondary pressure lower limit.

The following describes configuration of a continuously variable transmission control device according to the second embodiment, which is applied to an FF hybrid vehicle as in the first embodiment. Sections [Whole System Configuration] and [Configuration of Shift Control of Belt-Type Continuously Variable Transmission] for the second embodiment are the same as in the first embodiment, and description thereof and related drawings are omitted. The following describes a section [Configuration of Process of Low Speed Position Return Expediting Control] for the second embodiment.

Figure 8:
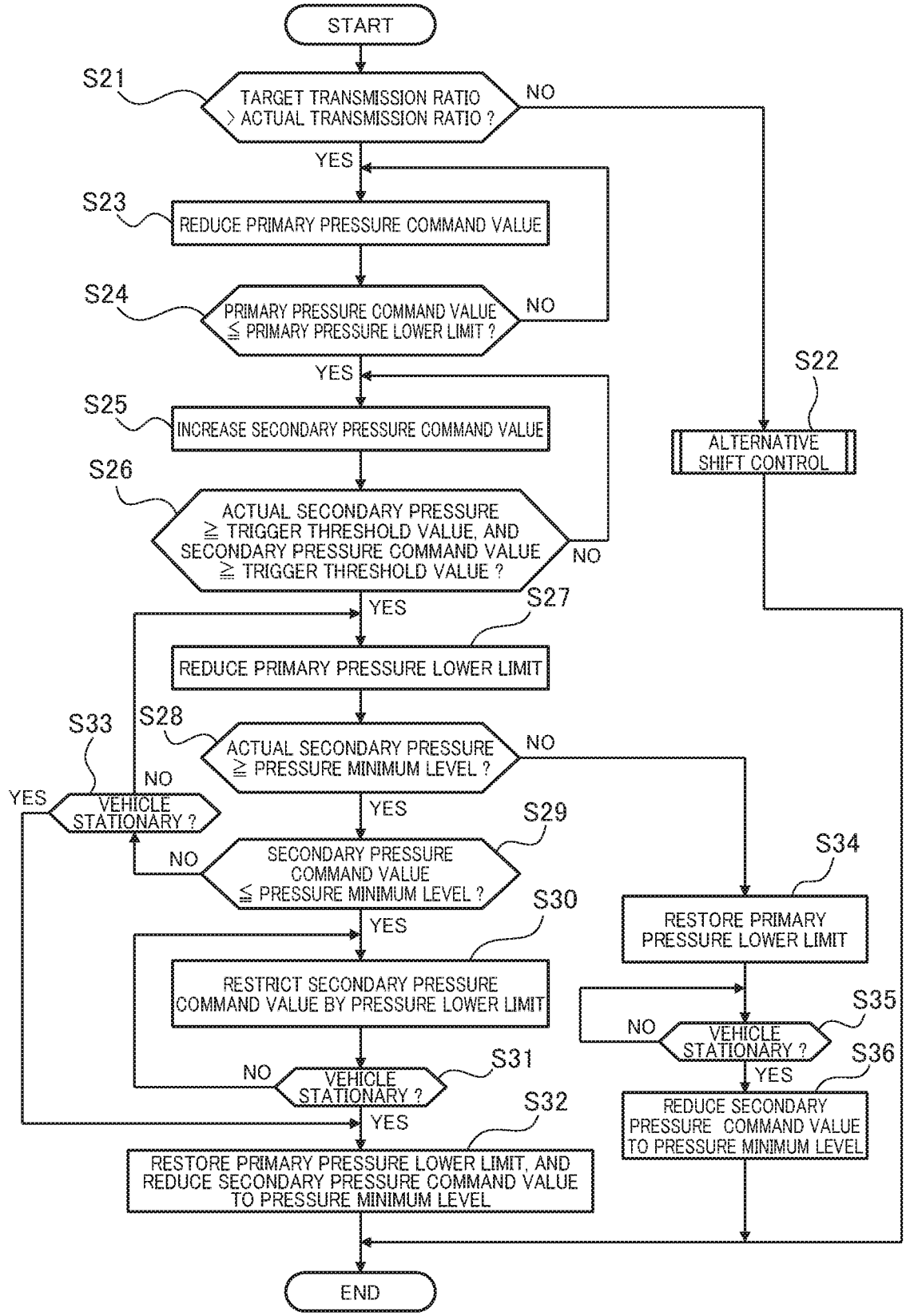
FIG. 8 is a flow chart showing a flow of low speed position return expediting control process performed by a CVT controller according to a second embodiment.

[Configuration of Process of Low Speed Position Return Expediting Control] FIG. 8 is a flow chart showing a flow of low speed position return expediting control process performed by CVT controller 15 according to the second embodiment. The following describes steps of FIG. 8 for configuration of the process of the low speed position return expediting control. Steps S21 to S25 correspond to Steps S1 to S5 in FIG. 3, and description thereof is omitted.

At Step S26, following the increase of the secondary pressure command value at Step S25, CVT controller 15 determines whether or not the actual secondary pressure becomes greater than or equal to the trigger threshold value, and the secondary pressure command value becomes greater than or equal to the trigger threshold value. In case of YES (the actual secondary pressure≥the trigger threshold value, and the secondary pressure command value≥the trigger threshold value), CVT controller 15 proceeds to Step S27. In case of NO (the actual secondary pressure<the trigger threshold value, or the secondary pressure command value<the trigger threshold value), CVT controller 15 returns to Step S25.

The trigger threshold value is set equal to the secondary pressure lower limit. The secondary pressure lower limit is set higher than a secondary pressure minimum level that is a minimum level required to prevent belt slipping from being caused by an input torque to secondary pulley 40. Namely, the control of secondary pressure Psec is based on pressure setpoint values including the trigger threshold value, the secondary pressure lower limit, and the secondary pressure minimum level, in a relationship of the trigger threshold value=the secondary pressure lower limit>the secondary pressure minimum level.

Steps S27 to S36 correspond to Steps S7 to S16 in FIG. 3, and description thereof is omitted.

The following describes actions of the second embodiment, separately in sections "Actions of Low Speed Position Return Expediting Control by Second Embodiment" and "Characteristic Actions of Low Speed Position Return Expediting Control", where sections "Actions of Process of Low Speed Position Return Expediting Control" and "Actions of Low Speed Position Return Expediting Control by Comparative Example" are the same as in the first embodiment, and description thereof and related drawings are omitted.

[Actions of Low Speed Position Return Expediting Control by Second Embodiment] FIG. 9 is a time chart showing characteristics of quantities when the low speed position return expediting control is performed under slow deceleration where the secondary pressure command value decreases, according to the second embodiment. The following describes actions of the low speed position return expediting control according to the second embodiment under slow deceleration with reference to FIG. 9.

At a time instant t1 when downshifting is started, a regenerative torque causes a large deceleration G to start to reduce the vehicle speed, and the primary pressure command value starts to be reduced. Then, the primary pressure command value decreases at the predetermined gradient, and at a time instant t2, reaches the primary pressure lower limit (as indicated by point A in FIG. 9), and is maintained at the primary pressure lower limit during a time period from time instant t2 to a time instant t3. On the other hand, the secondary pressure command value is comparable to the secondary pressure minimum level until time instant t2, and starts to be increased to a point of time instant t3.

When the actual secondary pressure reaches the value corresponding to the secondary pressure lower limit and the trigger threshold value at a time instant prior to time instant t3 (as indicated by point P in FIG. 9) and the actual secondary pressure reaches the same value at time instant t3 (as indicated by point B in FIG. 9), the condition for starting the low speed position return expediting control is satisfied. Accordingly, at time instant t3, the primary pressure command value starts to be reduced from the primary pressure lower limit toward the primary pressure minimum level. In the situation of slow deceleration, the secondary pressure command value starts to be reduced at a time instant t3, in order to prevent the low speed position return shifting from becoming excessive by the reduction of the primary pressure command value, and the secondary pressure command value reaches the secondary pressure lower limit at a time instant t4 (as indicated by point M in FIG. 9). Accordingly, the secondary pressure command value is maintained at the secondary pressure lower limit by restriction by the secondary pressure lower limit during a time period from time instant t4 to a time instant t5. On the other hand, the primary pressure command value is maintained at the value obtained at time instant t4 when the secondary pressure command value reaches the secondary pressure lower limit (>the primary pressure minimum level).

Then, at time instant t5 when the vehicle gets stationary (as indicated by point D in FIG. 9), the primary pressure command value is restored from that value to the primary pressure lower limit, and the secondary pressure command value is caused to decrease from the secondary pressure lower limit toward the secondary pressure minimum level at the predetermined gradient of decrease.

In this way, in such a situation of slow deceleration, the low speed position return expediting control for reduction of the primary pressure command value below the primary pressure lower limit is active during the time period from time instant t3 to time instant t5. Accordingly, the low speed position return expediting control causes the shift speed to increase toward the lowest speed position transmission ratio in an accelerated manner, as shown in an area indicated by an arrow E in FIG. 9 about characteristics of the pulley speed ratio. Namely, according to the second embodiment, even in the situation of slow deceleration, the low speed position return expediting control behaves as in FIG. 4 for rapid deceleration.

Furthermore, as compared to the situation of slow deceleration in the comparative example (FIG. 5), the situation of slow deceleration in the second embodiment (FIG. 9) causes no hydraulic pressure hunting and no regenerative torque shocks as in the comparative example.

[Characteristic Actions of Low Speed Position Return Expediting Control] The second embodiment is configured to: set the trigger threshold value equal to the secondary pressure lower limit; and start the reduction of the primary pressure lower limit in response to the condition that the secondary pressure command value is greater than or equal to the trigger threshold value and the actual secondary pressure becomes greater than or equal to the trigger threshold value during downshifting. The actual secondary pressure deviates from the secondary pressure command value. Namely, in some situations, the actual secondary pressure is temporarily higher than the secondary pressure command value. In such a situation, if the reduction of primary pressure Ppri is started only in response to the condition of the actual secondary pressure the trigger threshold value, the reduction of primary pressure Ppri is started when the secondary pressure command value is less than the trigger threshold value. In this situation, the secondary pressure command value is less than the secondary pressure lower limit, and cannot be maintained at the secondary pressure lower limit. In view of the foregoing, the condition for starting the reduction of primary pressure Ppri is implemented by the condition that both of the secondary pressure command value and the actual secondary pressure become greater than or equal to the trigger threshold value. This serves to ensure start of the reduction of primary pressure Ppri, and also set the trigger threshold value low in conformance with the secondary pressure lower limit, thereby advancing the start of the low speed position return expediting control.

The following describes effects of the control device for belt-type continuously variable transmission CVT according to the second embodiment in addition to the effects (1) to (4) of the first embodiment as follows.

<6> The controller (CVT controller 15) is configured to: set a trigger threshold value equal to the secondary pressure lower limit; and start the reduction of the primary pressure (Ppri, the primary pressure lower limit) in response to a condition that a secondary pressure command value is greater than or equal to the trigger threshold value and an actual secondary pressure becomes greater than or equal to the trigger threshold value during downshifting. This serves to ensure start of the reduction of primary pressure Ppri, and also set the trigger threshold value low in conformance with the secondary pressure lower limit, thereby advancing the start of the low speed position return expediting control.

Although the continuously variable transmission control device according to the present invention has been described with reference to the first and second embodiments as described above, specific configuration of the present invention is not limited to the embodiments, but may be carried out with design modification and addition without going out of the substance of the present invention related to the present claims.

The first and second embodiments are exemplified such that the low speed position return expediting control is implemented by reducing primary pressure Ppri and increasing secondary pressure Psec, and thereby increasing the differential pressure between primary pressure Ppri and secondary pressure Psec, in response to a downshift request accompanying deceleration. However, the low speed position return expediting control may be implemented by increasing the differential pressure between primary pressure Ppri and secondary pressure Psec only by reducing primary pressure Ppri, in response to a downshift request accompanying a deceleration. Namely, it is sufficient that the low speed position return expediting control is based on the reduction of primary pressure Ppri.

The first and second embodiments are exemplified such that when the low speed position return expediting control is started, the primary pressure lower limit is reduced and the primary pressure is reduced toward the reduced primary pressure lower limit. However, the low speed position return expediting control may be configured such that when the low speed position return expediting control is started, the primary pressure command value is reduced toward a target value of the low speed position return expediting control without reduction of the primary pressure lower limit.

The first embodiment is exemplified such that the continuously variable transmission control device according to the present invention is applied to the FF hybrid vehicle including the engine and the motor generator. However, the continuously variable transmission control device according to the present invention may be applied to an engine vehicle, an electric vehicle, and a fuel cell vehicle, if the vehicle is provided with a hydraulically-controlled belt-type continuously variable transmission.

The invention claimed is:

1. A hybrid vehicle control device for a hybrid vehicle including an engine, a motor generator, and a belt-type continuously variable transmission, the hybrid vehicle control device comprising:
   a controller configured to:
      perform a low speed position return expediting control in response to a downshift request accompanying deceleration, wherein the low speed position return expediting control is configured to: increase a differential pressure between a primary pressure and a secondary pressure and cause a downshift toward a lowest speed position transmission ratio by reducing the primary pressure; and further reduce the primary pressure in response to a condition that the secondary pressure becomes greater than or equal to a trigger threshold value during the downshift;
      terminate the low speed position return expediting control in response to a condition that an actual secondary pressure decreases to a secondary pressure minimum level; and
      set a secondary pressure lower limit higher than the secondary pressure minimum level during the low speed position return expediting control, wherein the secondary pressure lower limit is a lower limit value of the secondary pressure.

2. The hybrid vehicle control device as claimed in claim 1, wherein the controller is configured to set the secondary pressure lower limit to a sum of the secondary pressure minimum level and a margin of deviation of actual secondary pressure with respect to secondary pressure command value.

3. The hybrid vehicle control device as claimed in claim 2, wherein the controller is configured to:
   determine whether a first condition is satisfied where a secondary pressure command value becomes less than or equal to the secondary pressure lower limit after starting the low speed position return expediting control for reduction of the primary pressure; and
   in response to a determination that the first condition is satisfied, maintain a primary pressure command value at a value when the determination is made, and restrict the secondary pressure command value by the secondary pressure lower limit.

4. The hybrid vehicle control device as claimed in claim 3, wherein the controller is configured to:
   determine whether a second condition is satisfied where the actual secondary pressure becomes less than the secondary pressure minimum level before the secondary pressure command value becomes less than the secondary pressure lower limit after starting the low speed position return expediting control for reduction of the primary pressure; and
   in response to a determination that the second condition is satisfied, restore the primary pressure.

5. The hybrid vehicle control device as claimed in claim 2, wherein the controller is configured to:
   set the trigger threshold value to a sum of the secondary pressure lower limit and a margin of deviation of actual secondary pressure with respect to secondary pressure command value; and start the reduction of the primary pressure in response to a condition that the actual secondary pressure becomes greater than or equal to the trigger threshold value during downshifting.

6. The hybrid vehicle control device as claimed in claim 2, wherein the controller is configured to:
set the trigger threshold value equal to the secondary pressure lower limit; and
start the reduction of the primary pressure in response to a condition that a secondary pressure command value is greater than or equal to the trigger threshold value and an actual secondary pressure becomes greater than or equal to the trigger threshold value during downshifting.

7. The hybrid vehicle control device as claimed in claim 1, wherein the controller is configured to:
determine whether a first condition is satisfied where a secondary pressure command value becomes less than or equal to the secondary pressure lower limit after starting the low speed position return expediting control for reduction of the primary pressure; and
in response to a determination that the first condition is satisfied, maintain a primary pressure command value at a value when the determination is made, and restrict the secondary pressure command value by the secondary pressure lower limit.

8. The hybrid vehicle control device as claimed in claim 7, wherein the controller is configured to:
determine whether a second condition is satisfied where the actual secondary pressure becomes less than the secondary pressure minimum level before the secondary pressure command value becomes less than the secondary pressure lower limit after starting the low speed position return expediting control for reduction of the primary pressure; and
in response to a determination that the second condition is satisfied, restore the primary pressure.

9. The hybrid vehicle control device as claimed in claim 1, wherein the controller is configured to:
set the trigger threshold value to a sum of the secondary pressure lower limit and a margin of deviation of actual secondary pressure with respect to secondary pressure command value; and
start the reduction of the primary pressure in response to a condition that the actual secondary pressure becomes greater than or equal to the trigger threshold value during downshifting.

10. The hybrid vehicle control device as claimed in claim 1, wherein the controller is configured to:
set the trigger threshold value equal to the secondary pressure lower limit; and
start the reduction of the primary pressure in response to a condition that a secondary pressure command value is greater than or equal to the trigger threshold value and an actual secondary pressure becomes greater than or equal to the trigger threshold value during downshifting.

* * * * *